Patented Aug. 19, 1924.

1,505,568

UNITED STATES PATENT OFFICE.

AUGUST LEOPOLD LASKA AND ARTHUR ZITSCHER, OF OFFENBACH-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

AZO DYES INSOLUBLE IN WATER AND PROCESS OF MAKING SAME.

No Drawing.     Application filed November 23, 1922.  Serial No. 602,895.

*To all whom it may concern:*

Be it known that we, AUGUST LEOPOLD LASKA and ARTHUR ZITSCHER, both citizens of the German Republic, and residents of Offenbach-on-the-Main, Germany, have invented certain new and useful Improvements in Azo Dyes Insoluble in Water and Processes of Making Same; and we do hereby declare the following to be a full, clear, and exact description of the invention, such as will enable others skilled in the art to which it appertains to make and use the same.

Our invention relates to new azo dyestuffs, which can be used for the production of pigment colors and which can be also produced on the vegetable fibre.

We have found, that by combining a diazo compound not containing a sulfo or carboxylic group with a diacylacetyl compound of the benzidine series of the general formula:

wherein X means a diaryl residue, Y any radical of the hydrocarbon series, azodyestuffs, insoluble in water, are obtained, which are distinguished by valuable properties.

Under the term "any radical of the hydrocarbon series" for Y we include as well aliphatic as aromatic radicals.

Azodyestuffs, derived from the diacylacetyl compounds of the benzidine series, have not been known hitherto.

In view of the publications hitherto made concerning dyestuffs derived from acetoaceticacidarylides it is remarkable that, as we have found, sufficiently colored pigments are obtained not only by the combinations of nitrodiazo compounds with the diacylacetyl compounds of the benzidine series but also by the combination of diazo compounds of chlorine substituted anilines and even of aniline itself and of its homologues with diacylacetyl compounds of the benzidine series.

Especially surprising and important is the discovery, that the diacylacetyl compounds of the benzidine series possess a certain affinity for cotton making possible the production of the dyestuffs on the fiber by padding the material with an alkaline solution of a diacylacetyl compound of the benzidine series and after squeezing without drying, developing with a diazo compound. The colors thus obtained are completely fast to washing, they show a good, partly extraordinary fastness to light and an excellent fastness to chlorine. By using the known combinations with the aceto-acetic-acid arylides it was hitherto not possible to produce sufficiently strong and useful colors on cotton yarn by means of the process for ice colors.

The new dyestuffs are, when dry, yellow to brown and Bordeaux red powders, insoluble in water, and soluble in sulfuric acid to a yellow to violet solution, giving, mixed with substrata, usual for the production of color lakes or produced in their presence valuable pigments, the fastness to oil being conditional upon the nature of the substituents in the diazo or arylamine residue and dyeing, when produced on the fiber, cotton in fast yellow to brown and Bordeaux red shades.

As diazo compounds we may use in this process those of aniline and its homologues and substitution products, such as toluidines, anisidines, chloro- and nitroanilines, chloro- and nitrotoluidines, chloro- and nitroanisidines, also those of naphthylamines, aminoanthraquinones, aminoazo compounds, diamino bases and others, as azo components we may use diacetoacetyl-benzidine itself (its formula being

and its derivatives, substituted in the diphenyl residue, dibenzoylacetyl benzidine, its derivatives, substituted in the diphenyl residue, and other diarylacetyl compounds, which can be produced by condensing acylacetic acid esters with diamino bases of the diphenyl series.

The following examples illustrate the invention, the parts being by weight.

Example 1.

32.4 parts of 2.5-dichloroaniline are diazotized in the usual manner and the diazo solution is added to a solution of 40 parts of diacetoacetyl-ortho-tolidine in aqueous alkali, to which is added a sufficient quantity of sodium acetate. The formula of diacetoacetyl-ortho-tolidine is

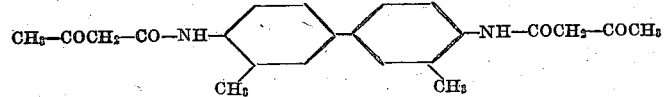

When the combination is complete, the dyestuff is filtered, well washed and ground to a paste. Mixed with the usual substrata it forms a reddish yellow lake of a very good fastness.

Example 2.

25.5 parts of ortho-chloroaniline are diazotized in the usual manner and the diazosolution is added to a solution of 49 parts of dibenzoylacetyl-benzidine in aqueous alkali, to which is added a sufficient quantity of sodium acetate. When the combination is complete, the dyestuff is filtered, well washed and ground to a paste. Mixed with the usual substrata it forms a yellow lake of a very good fastness.

Production of the dyestuffs on the fiber.

Example 3.

The yarn, having been well boiled and dried, is impregnated with a solution of
10 gr. of diacetoacetyl-ortho-tolidine
15 cc. of caustic soda lye of 34° Bé. and
20 cc. of Turkey red oil in the liter, well wrung out and after or without being dried, developed in a diazo solution, with an addition of sodium acetate and containing
2.8 gr. of 5-chloro-1.2-toluidine or
2.6 gr. of ortho-chloroaniline or
2.8 gr. of ortho-nitroaniline in the liter.

In this manner we obtain greenish yellow tints with 5-chloro-1.2-toluidine, lemon yellow tints with ortho-chloroaniline and orange yellow tints with ortho-nitroaniline, all tints being of an excellent brightness and a good fastness.

Example 4.

The yarn having been well boiled and dried, is impregnated with a solution of
10 gr. of dibenzoylacetyl-ortho-tolidine
15 cc. of caustic soda lye of 34° Bé. and
20 cc. of Turkey red oil in the liter, well wrung out and, without being dried, developed in a diazo solution, with an addition of sodium acetate and containing 2.8 gr. of 2-chloro-1.4-toluidine in the liter. In this manner, clear, reddish yellow tints of an excellent fastness are obtained.

The new dyestuffs can also be produced by printing a diazo solution upon a padded fabric according to the usual method, also according to the method of nitrosamine printing.

With other diacetyl compounds of the benzidine series the process may be conducted similarly.

The following table gives some of the shades of a number of dyestuffs, prepared according to the present process, and of the color lakes, respectively, obtained therefrom:

| Diazo compound from— | Combined with— | Shades. |
|---|---|---|
| 2.5-Dichloroaniline | Diacetoacetyl-benzidine. | Yellow. |
| Ortho-nitroaniline | ___do___ | Reddish yellow. |
| 4-Chloro-2-nitroaniline | ___do___ | Reddish orange yellow. |
| 3-Nitro-1.4-toluidine | ___do___ | Brownly orange yellow. |
| 5-Nitro-1.2-toluidine | ___do___ | Orange yellow. |
| 4-Nitro-1.2-anisidine | ___do___ | Yellow. |
| 5-Nitro-1.2-anisidine | ___do___ | Brownly orange yellow. |
| 3-Nitro-1.4-anisidine | ___do___ | Reddish orange yellow. |
| Ortho-aminoazotoluene | ___do___ | Brownly yellow. |
| Dianisidine | ___do___ | Brown. |
| Aniline | Diacetoacetyl-ortho-tolidine. | Greenish yellow. |
| Ortho-toluidine | ___do___ | Greenish yellow. |
| Para-aminoacetanilide | ___do___ | Yellow. |
| Ortho-aminophenylether | ___do___ | Greenish yellow. |
| Ortho-chloroaniline | ___do (example 3)___ | Lemon yellow. |
| Meta-chloroaniline | ___do___ | Do. |
| Para-chloroaniline | ___do___ | Do. |
| 2.5-Dichloroaniline | ___do (example 1)___ | Do. |
| 4-Chloro-1.2-toluidine | ___do___ | Do. |
| 5-Chloro-1.2-toluidine | ___do (example 3)___ | Greenish yellow. |
| 3-Chloro-1.4-toluidine | ___do___ | Do. |
| 4-Chloro-1.2-anisidine | ___do___ | Do. |
| 5-Chloro-1.2-anisidine | ___do___ | Lemon yellow. |
| Ortho-nitroaniline | ___do (example 3)___ | Orange yellow. |
| 4-Chloro-2-nitroaniline | ___do___ | Reddish orange yellow. |
| 3-Nitro-1.4-toluidine | ___do___ | Orange yellow. |
| 5-Nitro-1.2-toluidine | ___do___ | Do. |
| 4-Nitro-1-naphthylamine | ___do___ | Yellowish brown. |
| α-Aminoanthraquinone | ___do___ | Brownly orange yellow. |
| β-Aminoanthraquinone | ___do___ | Brownish orange. |
| Ortho-aminoazotoluene | ___do___ | Yellowish orange. |
| 3-Aminocarbazol | ___do___ | Yellow. |
| Meta-nitrobenzeneazo-metatoluidine. | ___do___ | Orange. |
| Aminoazo-para-cresetol | ___do___ | Reddish orange. |
| Para-chlorobenzene-azo-paracresidine. | ___do___ | Reddish orange. |
| Benzene-azo-α-naphthylamine. | ___do___ | Orange red. |
| Ortho-chlorobenzene-azo-α-naphthylamine. | ___do___ | Brownish Bordeaux. |
| 2:5-Dimethoxybenzene-azo-α-naphthylamine. | ___do___ | Do. |
| Para-methoxybenzene-azo-1-amino-2-naphtholethylether. | ___do___ | Bluish Bordeaux. |
| Para-aminobenzene-azo-dimethylaniline. | ___do___ | Brownish orange. |
| 4.4¹-Diaminodiphenylamine. | ___do___ | Brown. |
| Para-aminobenzene-azo-α-naphthylamine. | ___do___ | Reddish brown. |
| Aniline | Diacetoacetyl-0.0¹-dichlorobenzidine | Reddish yellow. |
| Ortho-chloroaniline | ___do___ | Do. |
| 2.5-Dichloroaniline | ___do___ | Do. |
| 4-Chloro-1.2-anisidine | ___do___ | Do. |
| 5-Chloro-1.2-toluidine | ___do___ | Do. |
| Ortho-nitroaniline | ___do___ | Do. |
| 4-Chloro-2-nitroaniline | ___do___ | Do. |
| 5-Nitro-1.2-toluidine | ___do___ | Do. |

| Diazo compound from— | Combined with— | Shades. |
|---|---|---|
| α-Aminoanthraquinone. | Diacetoacetyl-o.o¹-dichlorobenzidinide | Orange. |
| Ortho-aminoazotoluene. | ___do___ | Orange yellow. |
| o.o¹-Dichlorobenzidine. | ___do___ | Brownish yellow. |
| Aniline. | Diacetoacetyl-dianisidide. | Lemon yellow. |
| Ortho-chloroaniline. | ___do___ | Yellow. |
| 2.5-Dichloroaniline. | ___do___ | Reddish yellow. |
| 5-Chloro-1.2-toluidine. | ___do___ | Lemon yellow. |
| 4-Chloro-1.2-anisidine. | ___do___ | Reddish yellow. |
| Ortho-nitroaniline. | ___do___ | Orange yellow. |
| 4-Chloro-2-nitroaniline. | ___do___ | Orange. |
| 5-Nitro-1:2-toluidine. | ___do___ | Orange. |
| 4-Nitro-1-naphthylamine. | ___do___ | Brownish orange. |
| α-Aminoanthraquinone. | ___do___ | Brownly orange. |
| Ortho-aminoazotoluene. | ___do___ | Orange yellow. |
| o.o¹-Dichlorobenzidine. | ___do___ | Golden-orange. |
| Meta-nitrobenzene-azo-meta-toluidine. | ___do___ | Orange. |
| Amino-azo-para-cresetol. | ___do___ | Reddish orange. |
| Para-chlorobenzene-azo-para-cresidine. | ___do___ | Orange red. |
| Para-methoxybenzene-azo-1-amino-2-naphtholethylether. | ___do___ | Bordeaux. |
| 4.4¹-Diaminodiphenylamine. | ___do___ | Brown. |
| o-Chloroanilina. | Dibenzoylacetyl-benzidinide. | Greenish yellow. |
| 2.5-Dichloroaniline. | ___do (example 2)___ | Reddish yellow. |
| 5-Chloro-1.2-toluidine. | ___do___ | Canary yellow. |
| 2-Chloro-1.4-toluidine. | ___do___ | Do. |
| 5-Nitro-1.2-toluidine. | ___do___ | Orange. |
| Ortho-aminoazotoluene. | ___do___ | Do. |
| α-Aminoanthraquinone. | ___do___ | Do. |
| o-Chloroaniline. | Dibenzoylacetyl-ortho-tolidinide. | Lemon yellow. |
| 2.5-Dichloroaniline. | ___do___ | Reddish yellow. |
| 5-Chloro-1.2-toluidine. | ___do___ | Do. |
| 5-Nitro-1.2-toluidine. | ___do (example 4)___ | Golden orange. |
| Ortho-aminoazotoluene. | ___do___ | Do. |
| α-Aminoanthraquinone. | ___do___ | Do. |
| 2-Chloro-1.4-toluidine. | ___do___ | Reddish yellow. |

Now what we claim and desire to secure by Letters Patent is the following:

1. As new products the azodyestuffs, insoluble in water, which can be obtained by combining a diazo compound not containing a sulfo or carboxylic group with a diacyl acetyl compound of the benzidine series of the general formula:

$$Y.CO.CH_2.CO.NH.X.NH.CO.CH_2.CO.Y,$$

wherein X means a diaryl residue, Y any radical of the hydrocarbon series, which dyestuffs probably have the general formula:

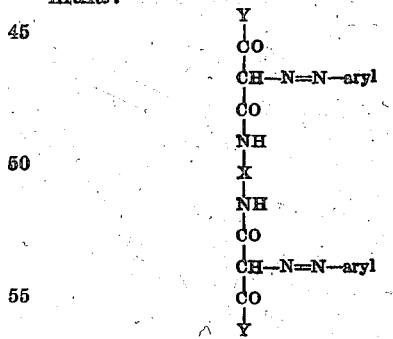

wherein X means a diaryl residue, Y any radical of the hydrocarbon series, which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

2. A process of making azodyestuffs, insoluble in water consisting in combining a diazo compound not containing a sulfo or carboxylic group with a diacylacetyl compound of the benzidine series of the general formula:

$$Y.CO.CH_2.CO.NH.X.NH.CO.CH_2.CO.Y,$$

wherein X means a diaryl residue, Y any radical of the hydrocarbon series.

3. A process of producing on the fiber of cotton goods, azodyestuffs insoluble in water, which consists in treating the cotton goods after impregnation with a diacyl acetyl compound of the benzidine series of the general formula:

$$Y.CO.CH_2.CO.NH.X.NH.CO.CH_2.CO.Y,$$

wherein X means a diaryl residue, Y any radical of the hydrocarbon series, with a diazo compound not containing a sulfo or carboxylic group.

4. As new products the azodyestuffs, insoluble in water, which can be obtained by combining a diazo compound not containing a sulfo or carboxylic group with a diacetoacetyl compound of the benzidine series of the general formula:

$$CH_3.CO.CH_2.CO.NH.X.$$
$$NH.CO.CH_2.CO.CH_3,$$

wherein X means a diaryl residue, which dyestuffs probably have the general formula:

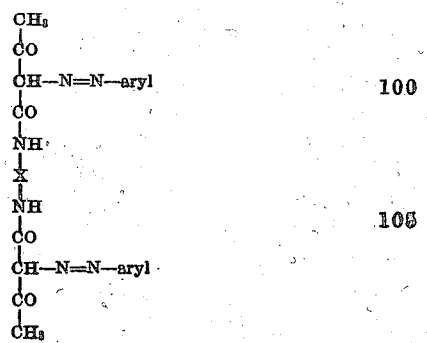

wherein X means a diaryl residue, which are when dry yellow to brown and Bordeaux red powders, insoluble in water, and soluble in sulfuric acid to a yellow to violet solution, said dyestuffs yielding valuable lakes and, when produced on the fiber fast yellow to brown and Bordeaux red shades.

5. A process of making azodyestuffs, insoluble in water consisting in combining a diazo compound not containing a sulfo or carboxylic group with a diacetoacetyl compound of the benzidine series of the general formula $$CH_3.CO.CH_2.CO.NH.X.$$
$$NH.CO.CH_2.CO.CH_3,$$

wherein X means a diaryl residue.

6. A process of producing on the fiber of cotton goods, azodyestuffs insoluble in water, which consists in treating the cotton goods after impregnation with a diaceto-acetyl compound of the benzidine series of the general formula:

wherein X means a diaryl residue, with a diazo compound not containing a sulfo or carboxylic group.

7. As new articles the azodyestuffs, insoluble in water, which can be obtained by combining a diazo compound negatively substituted and not containing a sulfo or carboxylic group, with a diaceto-acetyl compound of the benzidine series of the general formula:

wherein X means a diaryl residue, which dyestuffs probably have the general formula:

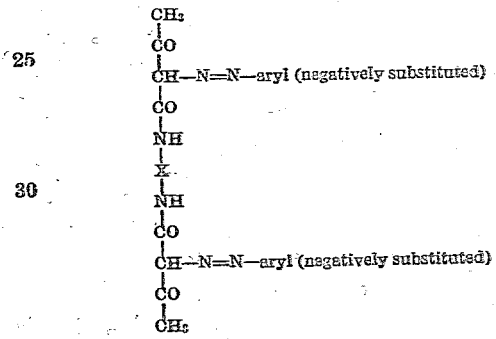

wherein X means a diaryl residue, which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

8. A process of making azodyestuffs, insoluble in water consisting in combining a diazo compound negatively substituted and not containing a sulfo or carboxylic group with a diaceto-acetyl compound of the benzidine series of the general formula:

wherein X means a diaryl residue.

9. A process of producing on the fiber of cotton goods, azodyestuffs insoluble in water, which consists in treating the cotton goods after impregnation with a diaceto-acetyl compound of the benzidine series of the general formula:

wherein X means a diaryl residue, with a diazo compound negatively substituted and not containing a sulfo or carboxylic group.

10. As new articles the azodyestuffs, insoluble in water, which can be obtained by combining a diazo compound not containing a sulfo or carboxylic group with diaceto-acetyl-ortho-tolidinide:

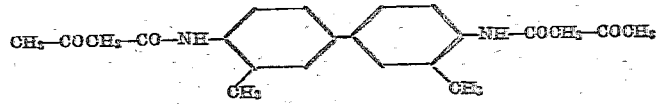

which dyestuffs probably have the general formula:

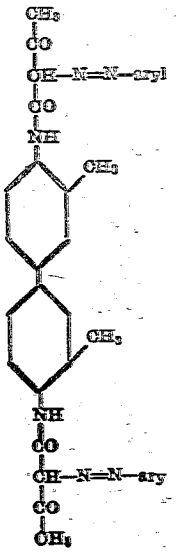

which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

11. A process of making azodyestuffs, insoluble in water consisting in combining a diazo compound not containing a sulfo or carboxylic group with diacetoacetyl-ortho-tolidine:

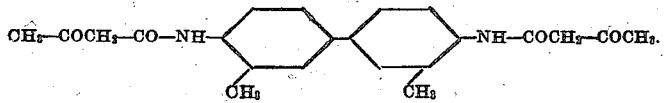

12. A process of producing on the fiber of cotton goods, azodyestuffs insoluble in water, which consists in treating the cotton goods after impregnation with diacetoacetyl-ortho-tolidine:

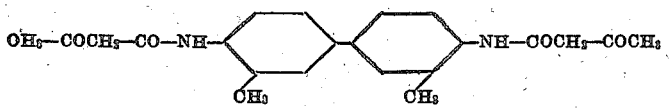

with a diazo compound not containing a sulfo or carboxylic group.

13. As new articles the azodyestuffs, insoluble in water, which can be obtained by combining a diazo compound negatively substituted and not containing a sulfo or carboxylic group, with diacetoacetyl-ortho-tolidine:

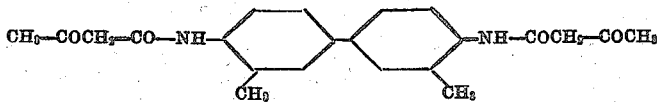

which dyestuffs probably have the general formula:

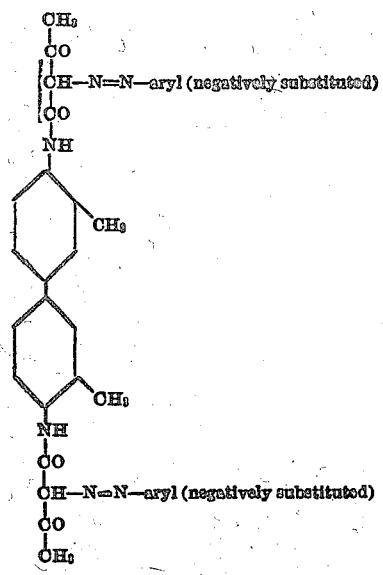

which are, when dry, yellow to brown and Bordeaux red powders insoluble in water, and soluble in sulfuric acid to a yellow to violet solution, said dyestuffs yielding valuable lakes and when produced on the fiber, fast yellow to brown and Bordeaux red shades.

14. A process of making azodyestuffs, insoluble in water consisting in combining a diazo compound negatively substituted and not containing a sulfo or carboxylic group with diacetoacetyl-ortho-tolidine:

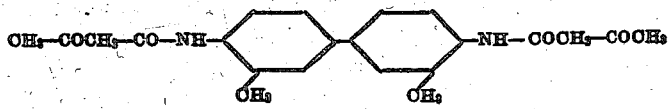

15. A process of producing on the fiber of cotton goods, azodyestuffs insoluble in water, which consists in treating the cotton

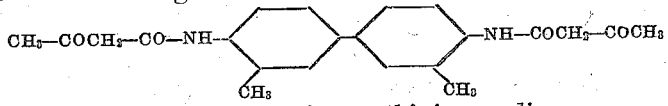

with a diazo compound negatively substituted and not containing a sulfo or carboxylic group.

16. As new articles the azodyestuffs, insoluble in water, which can be obtained by

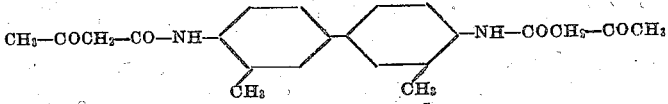

which dyestuffs probably have the general formula:

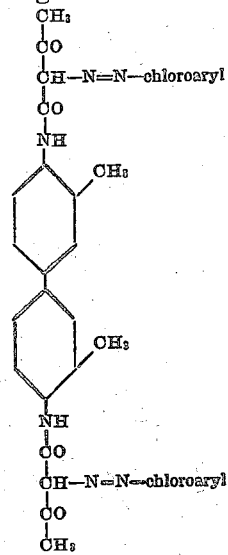

which are, when dry, yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

18. A process of producing on the fiber of cotton goods, azodyestuffs insoluble in water, which consists in treating the cotton

combining a diazo compound chloro substituted and not containing a sulfo or carboxylic group, with diacetoacetyl-ortho-tolidine:

goods after impregnation with diacetyl-ortho-tolidine:

17. A process of making azodyestuffs, insoluble in water, consisting in combining a diazo compound chloro substituted and not containing a sulfo or carboxylic group with diacetoacetyl-ortho-tolidine:

goods after impregnating with diacetoacetyl-ortho-tolidine:

with a diazo compound chloro substituted and not containing a sulfo or carboxylic group.

In testimony whereof we affix our signatures.

AUGUST LEOPOLD LASKA.
ARTHUR ZITSCHER.

Witnesses:
C. C. L. B. WYLES,
F. A. WILLIAMS.